United States Patent
Cadarette et al.

(10) Patent No.: US 9,558,255 B2
(45) Date of Patent: Jan. 31, 2017

(54) MANAGING REPLICATION CONFIGURATION AVAILABILITY

(71) Applicant: International Business Machines Corporation, Armonk, NY (US)

(72) Inventors: Paul M. Cadarette, Hemet, CA (US); James D. Spyker, Toronto, CA (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 14/203,601

(22) Filed: Mar. 11, 2014

(65) Prior Publication Data

US 2015/0261838 A1    Sep. 17, 2015

(51) Int. Cl.
*G06F 17/30* (2006.01)

(52) U.S. Cl.
CPC ... *G06F 17/30575* (2013.01); *G06F 17/30339* (2013.01); *G06F 17/30566* (2013.01)

(58) Field of Classification Search
USPC .............. 707/687, 769, 722, 736, 758, 781
See application file for complete search history.

(56) References Cited

U.S. PATENT DOCUMENTS

| | | | |
|---|---|---|---|
| 7,076,685 | B2 | 7/2006 | Pillai et al. |
| 7,321,904 | B2 | 1/2008 | Holenstein et al. |
| 7,627,687 | B2 | 12/2009 | Ahal et al. |
| 7,805,407 | B1 | 9/2010 | Verbeke et al. |
| 9,229,999 | B2 | 1/2016 | Bourbonnais et al. |
| 2004/0030703 | A1 * | 2/2004 | Bourbonnais ..... G06F 17/30377 |
| 2010/0114826 | A1 | 5/2010 | Voutilainen et al. |
| 2010/0161551 | A1 | 6/2010 | Whynot |
| 2011/0126261 | A1 * | 5/2011 | Maes .................. G06F 21/6218 726/1 |
| 2012/0317134 | A1 * | 12/2012 | Bourbonnais ..... G06F 17/30371 707/769 |

(Continued)

FOREIGN PATENT DOCUMENTS

WO    2007052285 A2    5/2007

OTHER PUBLICATIONS

Tolleson, D. "An inside look at DB2 Advanced Enterprise Server Edition, Part 2: Q replication and federation". Jul. 14, 2011. developerWorks® . Copyright IBM Corporation 2011.

(Continued)

*Primary Examiner* — Sana Al Hashemi
(74) *Attorney, Agent, or Firm* — John W. Hayes; William H. Hartwell

(57) ABSTRACT

A computer-implemented method, carried out by one or more processors, for managing replication configurations. In an embodiment, the method comprises receiving, by one or more processors, a replication configuration for replicating data, wherein the replication configuration defines at least a target table in a target database based on a source table in a source database; initializing, by one or more processors, a federated view, wherein the federated view is based on at least the source table in the source database as defined in the replication configuration; utilizing, by one or more processors, the federated view to satisfy requesting applications, where requesting applications obtain data from the federated view; responsive to determining the replication of data is in spec, utilizing, by one or more processors, the target table in the target database to satisfy requesting applications.

15 Claims, 4 Drawing Sheets

(56) References Cited

U.S. PATENT DOCUMENTS

2014/0089254 A1    3/2014    Simon et al.

OTHER PUBLICATIONS

"Replication Strategies: Data Migration, Distribution and Synchronization". A Sybase® White Paper. Copyright 2003 Sybase, Inc. L02038 MIL6143.
"XTIVIA Knows Oracle Database Replication". Xtivia Inc. Copyright 2012. <www.Xtivia.com>.

* cited by examiner

MANAGING REPLICATION CONFIGURATION AVAILABILITY

BACKGROUND OF THE INVENTION

A typical replication process involves replicating data from a source database to a target database, where often there can be a transformation process. A replication configuration defines a set of data that should be available in the target database based on a set of data available in the source database. There can be situations that impact the availability of the set of data in the target database. For example, when the replication configuration is altered, there often will be new data that is available in the source database that is not available in the target database. A new replication configuration is created to define the new data in addition to the data previously defined in the original replication configuration.

The data as previously defined by the original replication configuration is not available until the new replication configuration is fulfilled. The data from the original replication configuration not being available can also be referenced to as data outage. Currently, an administrative user that created the original replication configuration has to determine when to introduce the new replication configuration, such that the data outage does not interfere with applications which can idle while waiting to access the data in the target database. The other issues with new replication configurations are possible replication latencies in the data being replicated into the target database, as well as possible replication errors that can occur.

SUMMARY

Embodiments in accordance with the present invention disclose a method, computer program product and computer system for managing replication configurations.

In an embodiment, a computer-implemented method for managing replication configurations comprises receiving, by one or more processors, a replication configuration for replicating data, wherein the replication configuration defines at least a target table in a target database based on a source table in a source database; initializing, by one or more processors, a federated view, wherein the federated view is based on at least the source table in the source database as defined in the replication configuration; utilizing, by one or more processors, the federated view to satisfy requesting applications, where requesting applications obtain data from the federated view; responsive to determining the replication of data is in spec, utilizing, by one or more processors, the target table in the target database to satisfy requesting applications.

DETAILED DESCRIPTION

Embodiments in accordance with the present invention manage replication configurations by receiving a replication configuration for replicating data, where the replication configuration defines a target table in a target database based on a source table in a source database. Embodiments in accordance with the present invention initialize a federated view, where the federated view is based on the source table in the source database as defined in the replication configuration. The federated view is utilized to satisfy requesting applications, where requesting applications obtain data from the federated view. Responsive to determining the replication of data is in spec, the target table in the target database is utilized to satisfy requesting applications.

Figure 1:
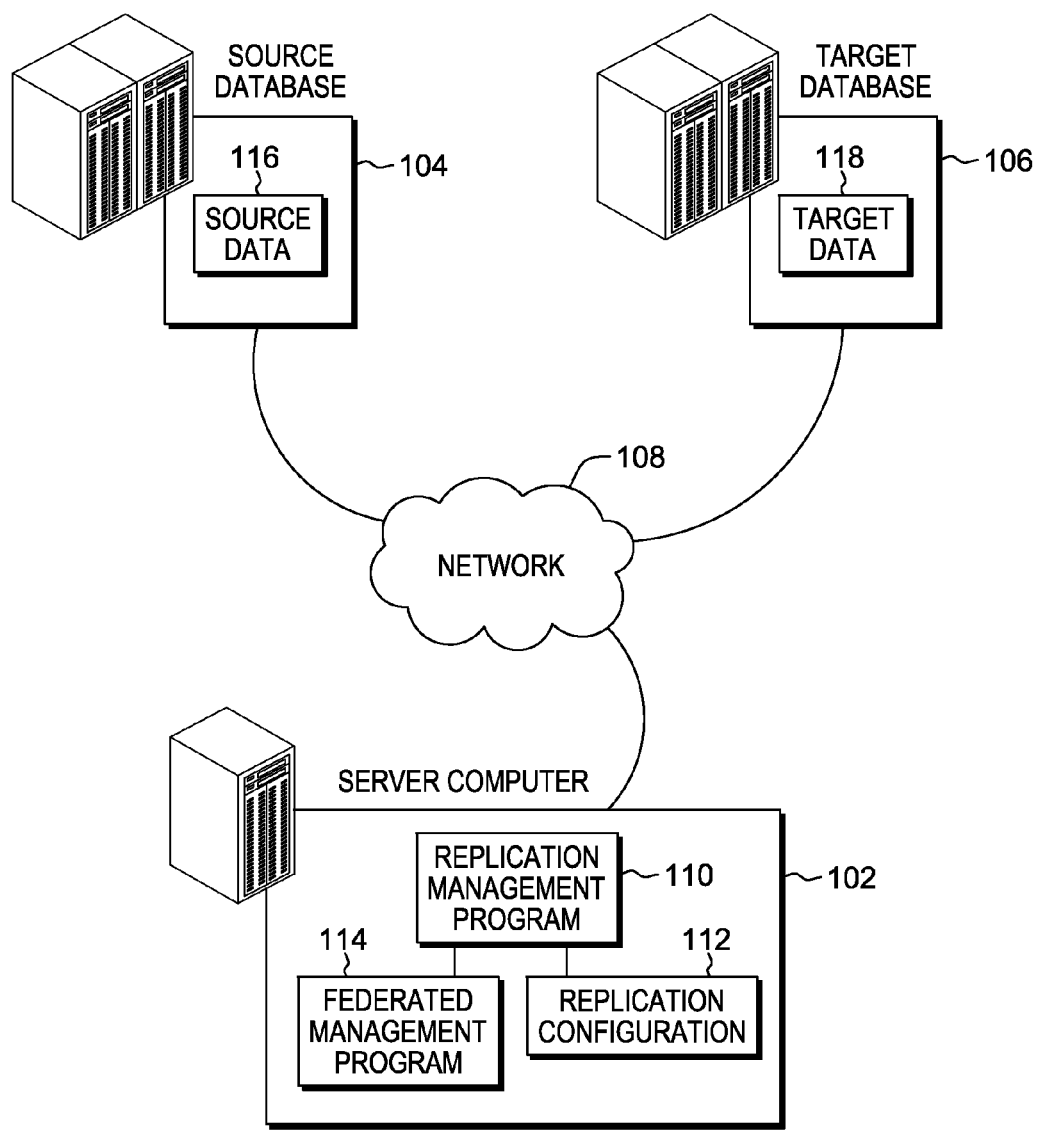
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes server computer 102, source database 104, and target database 106 interconnected over network 108.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through network 108, as is common in data centers and with cloud computing applications. In general, server computer 102 is representative of any programmable electronic device or combination of programmable electronic devices capable of executing machine-readable program instructions and communicating with other computer devices via a network. In this embodiment, server computer 102 has the ability to communicate with other computer devices to query the computer devices for information.

Replication management program 110 residing in server computer 102 has the ability to manage replication configuration availability. In one embodiment, replication management program 110 is capable of receiving replication configuration 112 for data in source database 104 which is to be replicated to target database 106. Utilizing federated management program 114, an application can query for data, which may have been previously defined by replication configuration 112. Replication management program 110 can send state information of the replication process to federated management program 114 specifying whether to use the source tables or the target tables to satisfy the query from the application. Replication management program 110 can determine to utilize the federated view for applications requesting the data if new replication configurations are received or if replication management program 110 determines latency in the replication process of the data to target database 106.

Replication management program 110 communicates with federated management program 114 to provide a virtualization strategy for applications requesting access to data. Federated management program 114 can push requests for data from target database 106 to source database 104, allowing the requesting application access to the data. Replication management program 110 can determine when to utilize federated management program 114 to push data requests from target database 106 to source database 104 based on various situations during the replication process.

Source database 104 and target database 106 can respectively store source data 116 and target data 118. Replication management program 110 utilizes replication configuration 112 to define the replication of source data 116 located in source database 104 to target database 106. Target data 118 represents the finished replicated data of source data 116 as defined by replication configuration 112. Source database 104 and target database 106 can also be located on server computer 102 or any other location in the distributed data processing environment connected to network 108.

In general, network 108 can be any combination of connections and protocols that will support communications between server computer 102, source database 104, and target database 106. Network 108 can include, for example, a local area network (LAN), a wide area network (WAN) such as the internet, a cellular network, or any combination of the preceding, and can further include wired, wireless, and/or fiber optic connections. In one embodiment, replication management program 110 and federated management program 114 may be a web service accessible via network 108 to a user of a separate device. In another embodiment, replication management program 110 and federated management program 114 may be operated directly by a user of server computer 102.

Figure 2:
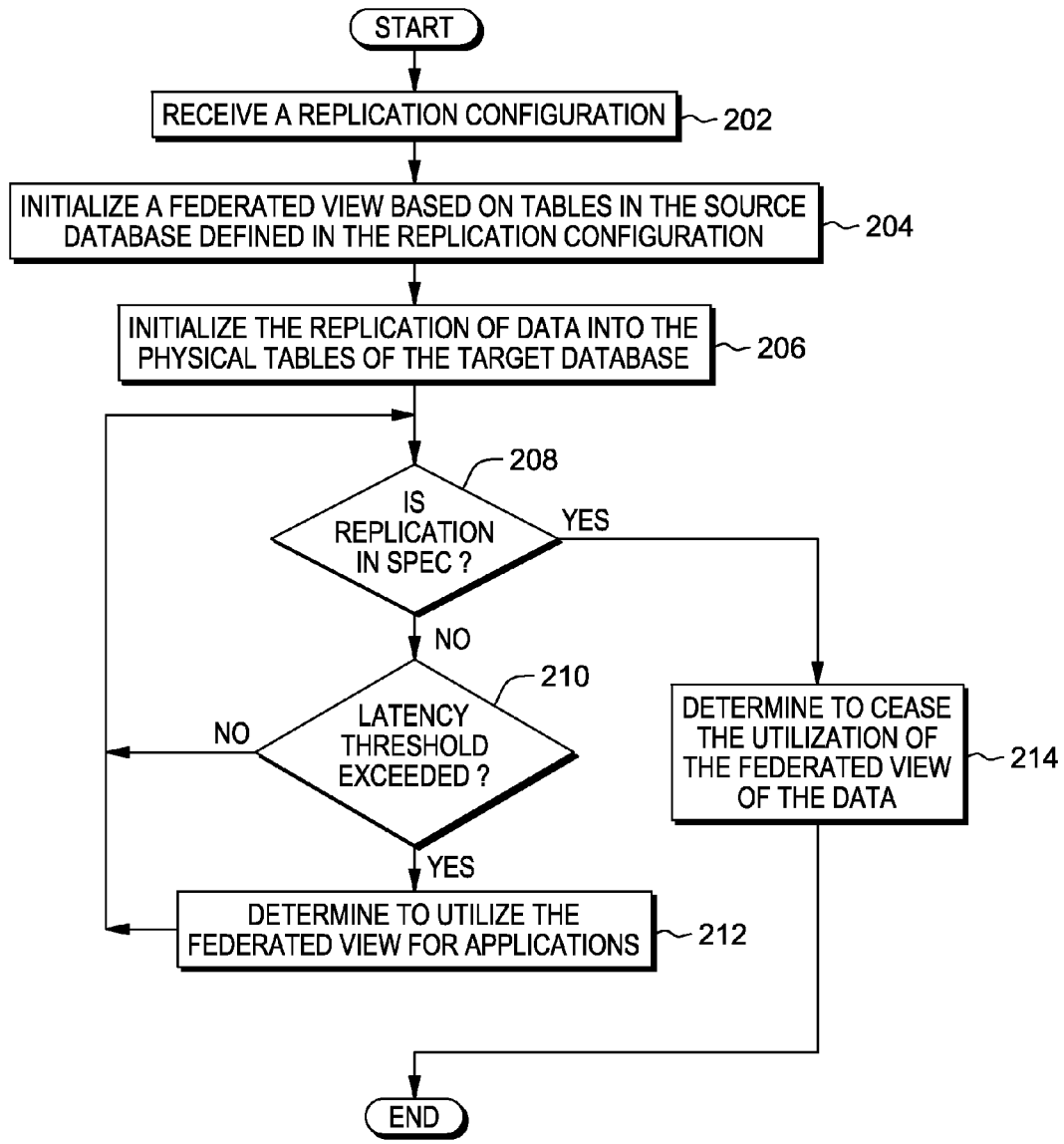
FIG. 2 is a flowchart depicting operational steps of a replication management program for managing replication configuration availability, in accordance with an embodiment of the present invention.

FIG. 2 is a flowchart depicting operational steps of a replication management program for managing replication configuration availability, in accordance with an embodiment of the present invention.

Replication management program 110 receives a replication configuration (step 202). In this embodiment, replication management program 110 receives the replication configuration for source data 116 being replicated to target database 106. Source data 116 located in source database 104 contains data listed in a source table with the headings "key", "first name", "last name", and "state". The replication configuration defines a replication to transform source data 116 in the source table to target data 118 in a target table with the headings "key", "full name", and "state". The replication configuration concatenates the "first name" and "last name" of source data 116 to create the "full name" of target data 118.

Replication management program 110 initializes a federated view based on tables in the source database defined in the replication configuration (step 204). In this embodiment, replication management program 110 communicates with federated management program 114 to initialize a federated view based on tables in source data 116. Replication management program 110 can utilizes the federated view for a requesting application in certain example scenarios such as, during replication latency increases and changes to the replication configuration. In another embodiment, replication management program 110 communicates with federated management program 114 to initialize a federated view based on replicated tables that exist in target database 106 during the replication process.

Replication management program 110 initialize the replication of data into the physical tables of the target database (step 206). Replication management program 110 initializes a synchronization of the replication configuration by creating views in target database 106 based on tables in source data 116 located in source database 104, where any information defined by the replication configuration is replicated into the views. Any application which requests data that is part of the replication configuration can utilize the views to obtain the data.

Since the requesting application already has access to the data, replication management program 110 can replicate the data into the physical tables of target database 106, where the physical tables have internal names. Subsequent to the synchronization being completed, replication management program 110 can rename the internal names of the physical tables to what is defined by the views of the replication configuration. For any queries replication management program 110 receives, the requesting application can utilizes the physical tables with the replicated data.

Replication management program 110 determines if the replication is in spec (decision step 208). In this embodiment, the replication being in spec represents a replication with a latency value that is within a specification previously defined by an administrative user (i.e., customer). In the event the replication is not in spec ("no" branch, step 208), replication management program 110 determines if a latency threshold (e.g., 10 seconds) was exceeded for the replication of source data 116 to target data 118. In the event the replication is in spec ("yes" branch, step 208), replication management program 110 determines to cease the utilization of the federated view of the data (step 214).

Replication management program 110 determines if a latency threshold is exceeded (decision step 210). In the event the latency threshold is not exceeded ("no" branch, step 210), replication management program 110 reverts back to decision step 208. In the event the latency threshold is exceeded ("yes" branch, step 210), replication management program 110 determines to utilize the federated view for applications until the replication of data is in spec, where the latency threshold is no longer exceeded.

In this embodiment, latency is a measure of the replication delay of data between source database 104 and target database 106. For example, replication management program 110 determines a latency value for the replication of data to be 5 seconds. However, a pre-determined latency threshold is 10 seconds. The pre-determined latency threshold can be configured by an administrative user of replication management program 110 depending on particular business cases. Replication management program 110 determines that the latency for the replication of data has not exceeded the latency threshold. The latency threshold indicates when target data 118 in target database 106 is no longer accurate for usage by a requesting application.

Replication management program 110 determines to utilize the federated view for applications (step 212). In this embodiment, the federated view is based on the tables of source data 116. Replication management program 110 utilizes the federated view while constantly monitoring the replication latency of source data 116. An administrative user of replication management program 110 can specify when to obtain latency values for the replication of source data 116 to determine whether or not the latency threshold has been exceeded. During instances where the latency threshold is not exceeded, replication management program 110 utilizes the physical tables of target data 118. In another embodiment, the federated view is based on the physical tables of target data 118. Replication management program 110 continuously maintains the physical tables of target data 118 according to any new replication configurations that replication management program 110 can receive.

In another embodiment, replication management program 110 monitors target data 118 to determine if a portion of the tables has been damaged during the replication process. Replication management program 110 determines to use the initialized federated view while replication management program 110 repairs the damaged portion of the tables.

Replication management program 110 provides availability of the data during the repair of the damaged portion through the federated view.

Replication management program 110 may determine to cease the utilization of the federated view of the data (step 214). Upon completion of the replication of source data 116 to target data 118, as previously defined by the replication configuration, replication management program 110 ceases the federated view. Replication management program 110 can send a notification to federated management program 114 specifying that replication is in spec and federated management program 114 can remove the federated view.

Figure 3:
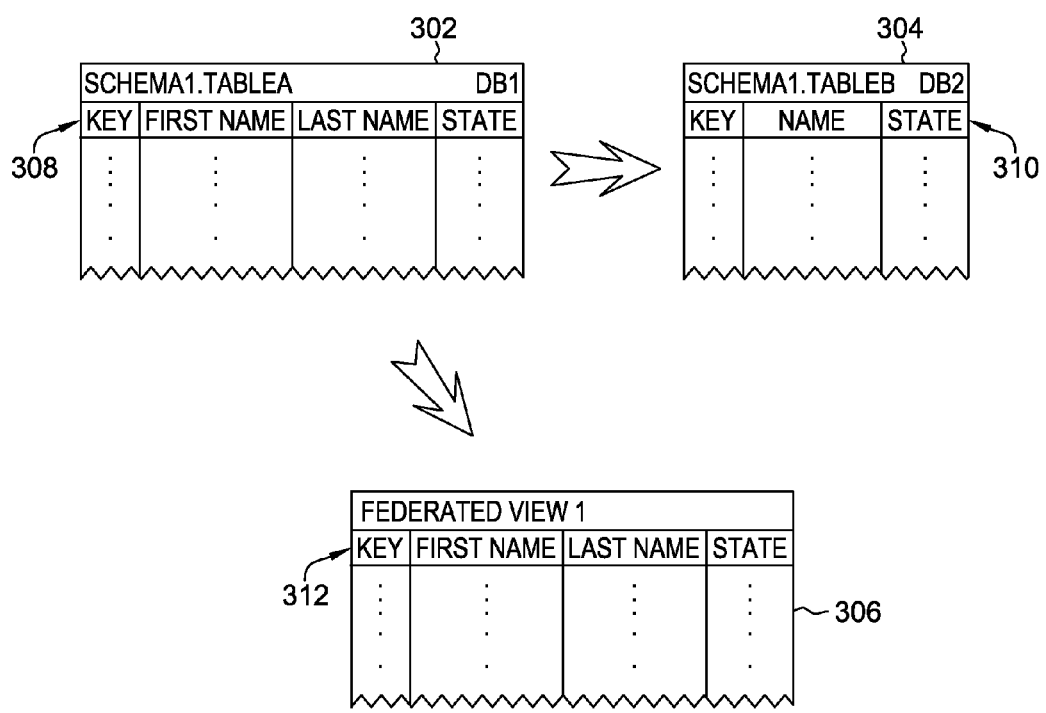
FIG. 3 illustrates an example scenario of a replication management program creating a federated view of a replication configuration, in accordance with an embodiment of the present invention.

FIG. 3 illustrates an example scenario of a replication management program creating a federated view of a replication configuration, in accordance with an embodiment of the present invention.

In this illustrated example, replication management program 110 receives a replication configuration, where source data 302 is being replicated to target data 304. As previously mentioned in an example during the discussion of FIG. 2, source table 308 includes column headings "key", "first name", "last name", and "state". Target table 310, also referred to as a physical table, includes column headings "key", "name", and "state", where the "name" is the concatenation of "first name" and "last name" from source table 308.

In this illustrated example, replication management program 110 queries federated management program 114 to initialize federated view 306. Federated view 306 is based on source table 308, where federated table 312 includes the same headings as source table 308. During the replication process, replication management program 110 monitors current latency values of the replication of data between source data 302 and target data 304. In the event a current latency value exceeds a threshold latency value, replication management program 110 determines to utilize federated view 306 to satisfy application requests. In the event the current latency value does not exceed the threshold latency value, replication management program 110 determines to utilize target data 304 to satisfy application requests. Replication management program 110 can utilize federated view 306 when a change in the replication configuration is received. As previously mentioned, federated view 306 is based on source table 308 to ensure the synchronization of target data 304 with the new replication configuration as defined by source data 302.

In another example not illustrated in FIG. 3, federated view 306 can be based on target table 310. When replication management program 110 receives a new replication configuration, replication management program has to re-initialize the replication and synchronize target table 310 to match the definitions set in the new replication configuration. During the re-initialization, replication management program 110 can choose to add or remove any portions of the tables as defined by the new replication configuration. Subsequent to the re-initialization, replication management program 110 can initialize federated view 306 based on the physical tables, target table 310.

Figure 4:
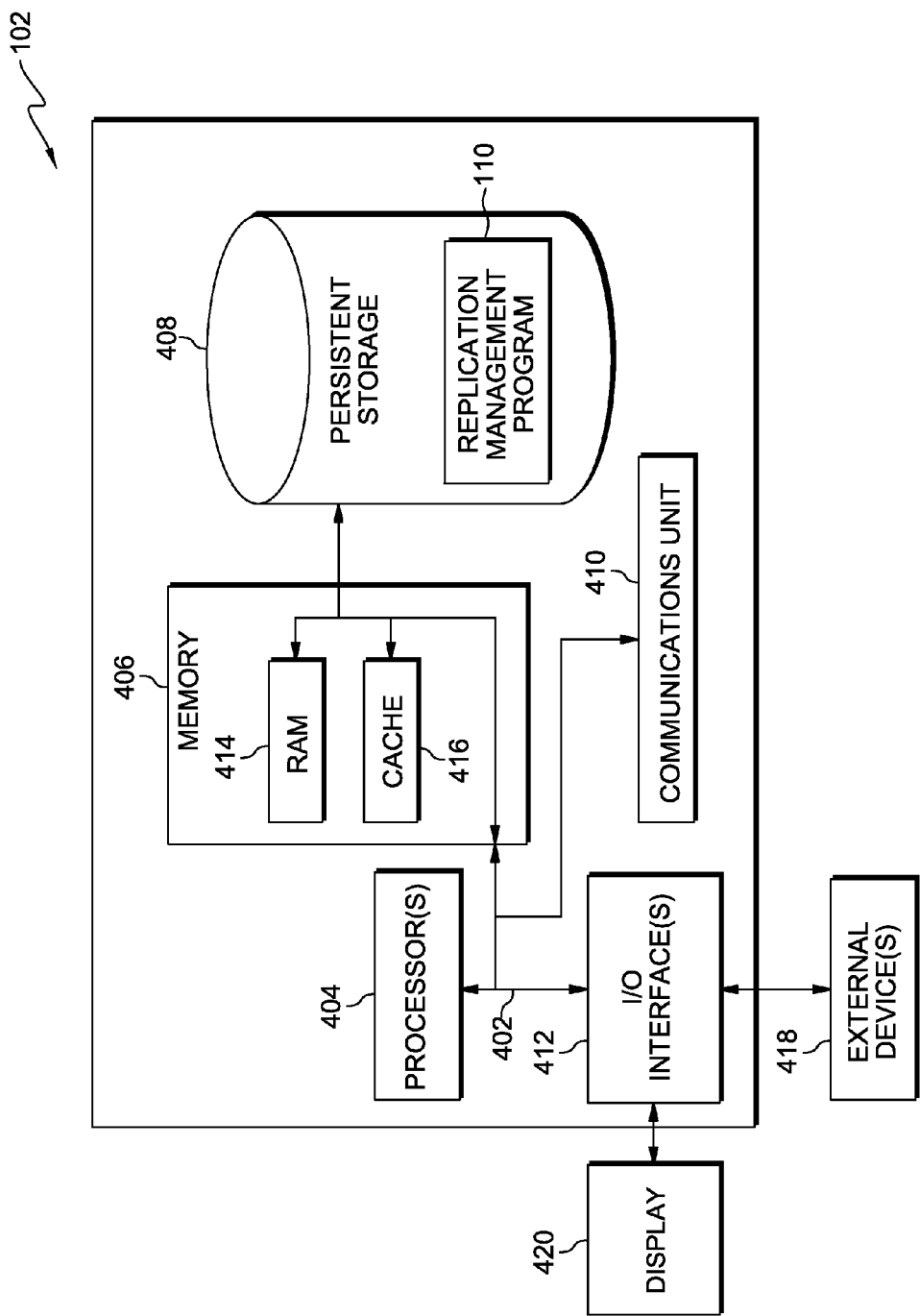
FIG. 4 is a block diagram of components of a computer system, such as the computer server of FIG. 1, in accordance with an embodiment of the present invention.

FIG. 4 depicts a block diagram of components of a computer, such as server computer 102, replication management program 110 within distributed data processing environment, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are examples of computerreadable tangible storage devices. A storage device is any piece of hardware that is capable of storing information, such as, data, program code in functional form, and/or other suitable information on a temporary basis and/or permanent basis. In this embodiment, memory 406 includes random access memory (RAM) 414 and cache memory 416. In general, memory 406 can include any suitable volatile or non-volatile computerreadable storage device.

Replication management program 110 is stored in persistent storage 408 for execution by one or more of computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computerreadable storage medium that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including systems and devices within or controlled by server computer 102. In these examples, communications unit 410 includes one or more wireless network interface cards. Communications unit 410 may provide communications through the use of either or both physical and wireless communications links. Computer programs and processes, such as replication management program 110, may be downloaded to persistent storage 408 through communications unit 410, or uploaded to another system through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computerreadable storage media such as, for example, thumb drives, portable optical or magnetic disks, and memory cards. Software and data used to practice embodiments in accordance with the present invention can be stored on such portable computer-readable storage media and can be loaded onto persistent storage 408 via I/O interface(s) 412. I/O interface(s) 412 may also connect to a display 420.

Display 420 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing replication configurations, the method comprising:
   receiving, by one or more processors, a replication configuration for replicating data, wherein the replication configuration defines at least a target table in a target database based on a source table in a source database;
   initializing, by one or more processors, a federated view, wherein the federated view is based on at least the source table in the source database as defined in the replication configuration;
   determining, by one or more processors, whether the replication of data is in spec, wherein the replication of data is in spec when a latency value of the replication is below or equal to a latency value threshold, and wherein the replication of data is not in spec when the latency value is above the latency value threshold; and
   satisfying, by one or more processors, a request by an application for data, wherein the satisfying of the request utilizes the federated view when the replication of data has been determined to not be in spec, and wherein the satisfying of the request utilizes the target table when the replication of data has been determined to be in spec.

2. A computer program product for managing replication configurations, the computer program product comprising:
   one or more computer readable tangible storage media and program instructions stored on at least one of the one or more storage media, the program instructions comprising:
   program instructions to receive a replication configuration for replicating data, wherein the replication configuration defines at least a target table in a target database based on a source table in a source database;
   program instructions to initialize a federated view, wherein the federated view is based on at least the source table in the source database as defined in the replication configuration;
   program instructions to determine whether the replication of data is in spec, wherein the replication of data is in spec when a latency value of the replication is below or equal to a latency value threshold, and wherein the replication of data is not in spec when the latency value is above the latency value threshold; and
   program instructions to satisfy a request by an application for data, wherein the satisfying of the request utilizes the federated view when the replication of data has been determined to not be in spec, and wherein the satisfying of the request utilizes the target table when the replication of data has been determined to be in spec.

3. A computer system for managing replication configurations the computer system comprising:
   one or more computer processors;
   one or more computer readable storage media; and
   program instructions stored on the computer readable storage media for execution by at least one of the one or more computer processors, the program instructions comprising:
   program instructions to receive a replication configuration for replicating data, wherein the replication configuration defines at least a target table in a target database based on a source table in a source database;
   program instructions to initialize a federated view, wherein the federated view is based on at least the source table in the source database as defined in the replication configuration;
   program instructions to determine whether the replication of data is in spec, wherein the replication of data is in spec when a latency value of the replication is below or equal to a latency value threshold, and wherein the replication of data is not in spec when the latency value is above the latency value threshold; and
   program instructions to satisfy a request by an application for data, wherein the satisfying of the request utilizes the federated view when the replication of data has been determined to not be in spec, and wherein the satisfying of the request utilizes the target table when the replication of data has been determined to be in spec.

4. The method of claim 1, further comprising:
   receiving, by one or more processors, a new replication configuration for replicating data, wherein the new replication configuration defines at least a new target table based on the source table; and
   determining, by one or more processors, to utilize the federated view to satisfy requesting applications.

5. The method of claim 1, further comprising:
   responsive to determining, by one or more processors, a portion of the target table in the target database is damaged, determining, by one or more processors, to utilize the federated view to satisfy requesting applications.

6. The method of claim 1, further comprising:
   initializing, by one or more processors, another federated view, wherein the other federated view is based on at least the target table in the target database in the replication configuration; and
   utilizing, by one or more processors, the other federated view to satisfy requesting applications, where requesting applications obtain data from the other federated view.

7. The computer program product of claim 2, further comprising program instructions, stored on the one or more computer readable storage media, which when executed by a processor, cause the processor to:
   receive a new replication configuration for replicating data, wherein the new replication configurations defines at least a new target table based on the source table; and
   determine to utilize the federated view to satisfy requesting applications.

8. The computer program product of claim 2, further comprising program instructions, stored on the one or more computer readable storage media, which when executed by a processor, cause the processor to:
   responsive to determining, by one or more processors, a portion of the target table in the target database is damaged, determine to utilize the federated view to satisfy requesting applications.

9. The computer program product of claim 2, further comprising program instructions, stored on the one or more computer readable storage media, which when executed by a processor, cause the processor to:
   initialize another federated view, wherein the other federated view is based on at least the target table in the target database in the replication configuration; and
   utilize the other federated view to satisfy requesting applications, where requesting applications obtain data from the other federated view.

10. The computer system of claim 3, further comprising program instructions, stored on the one or more computer readable storage media, which when executed by a processor, cause the processor to:

receive a new replication configuration for replicating data, wherein the new replication configuration defines at least a new target table based on the source table; and
determine to utilize the federated view to satisfy requesting applications.

11. The computer system of claim 3, further comprising program instructions, stored on the one or more computer readable storage media, which when executed by a processor, cause the processor to:
responsive to determining, by one or more processors, a portion of the target table in the target database is damaged, determine to utilize the federated view to satisfy requesting applications.

12. The computer system of claim 3, further comprising program instructions, stored on the one or more computer readable storage media, which when executed by a processor, cause the processor to:
initialize another federated view, wherein the other federated view is based on at least the target table in the target database in the replication configuration; and
utilize the other federated view to satisfy requesting applications, where requesting applications obtain data from the other federated view.

13. The method of claim 6, further comprising:
receiving, by one or more processors, a new replication configuration for replicating data, wherein the new replication configuration defines at least a new target table based on the source table;
initializing, by one or more processors, the other federated view, wherein the other federated view is based on at least the new target table in the target database in the new replication configuration; and
utilizing, by one or more processors, the other federated view to satisfy requesting applications, where requesting applications obtain data from the other federated view.

14. The computer program product of claim 9, further comprising program instructions, stored on the one or more computer readable storage media, which when executed by a processor, cause the processor to:
receive a new replication configuration for replicating data, wherein the new replication configuration defines at least a new target table based on the source table;
initialize the other federated view, wherein the other federated view is based on at least the new target table in the target database in the new replication configuration; and
utilize the other federated view to satisfy requesting applications, where requesting applications obtain data from the other federated view.

15. The computer system of claim 12, further comprising program instructions, stored on the one or more computer readable storage media, which when executed by a processor, cause the processor to:
receive a new replication configuration for replicating data, wherein the new replication configuration defines at least a new target table based on the source table;
initialize the other federated view, wherein the other federated view is based on at least the new target table in the target database in the new replication configuration; and
utilize the other federated view to satisfy requesting applications, where requesting applications obtain data from the other federated view.

\* \* \* \* \*